Feb. 25, 1930. A. T. GREEN 1,748,876
REBORING TOOL
Filed Feb. 11, 1927 2 Sheets-Sheet 2

Ansel T. Green INVENTOR
BY Victor J. Evans ATTORNEY

Patented Feb. 25, 1930

1,748,876

UNITED STATES PATENT OFFICE

ANSEL T. GREEN, OF ABERDEEN, SOUTH DAKOTA

REBORING TOOL

Application filed February 11, 1927. Serial No. 167,541.

My invention relates to certain novel improvements in reboring tools and more particularly to a reboring tool especially adapted for reboring the main bearings of an internal combustion engine and has for its principal object the provision of an improved construction of this character which will be highly efficient in use.

It is a universal custom in factory assembly to fit the crank shaft of an internal combustion engine to its bearings by a method which is commonly termed "burning in the bearings". This is accomplished by assembling the engine and coupling the crank shaft at a speed proportionate to burn in the bearings. The difficulty encountered with in this method resides in the fact that due to the tight fit between the crank shaft and the main bearings, the babbitt is often worked loose of shifted or otherwise damaged. Again it is the custom to obtain smooth and knockless fit between the main bearings and the crank shaft providing a tool which operates on the babbitt to remove such surface babbitt as is necessary to provide proper journal engagement between the main bearings, including their caps, and the crank shaft, and unless this tool is properly aligned the results will be that the bearings and the crank shaft will have what is called high spots resulting in bearing knocks. It is therefore one of the many objects of this invention to provide a tool which will accurately bore and rebore the main bearings of an internal combustion engine without injury to the babbitt and to hold the boring tool in proper alignment to assure perfect alignment between the main bearings and the cylinder bores assuring proper mesh between the timing gears.

Another object of the invention is to accomplish the results as set forth in my Patent No. 1,585,026 dated May 18, 1926, by a tool which will assure labor saving and is inexpensively constructed.

Other objects will appear hereinafter.

The invention consists in the novel combination and arrangement of parts to be hereinafter described and claimed.

The invention will be best understool by reference to the accompanying drawings, showing the preferred form of construction and in which.

Figure 1:
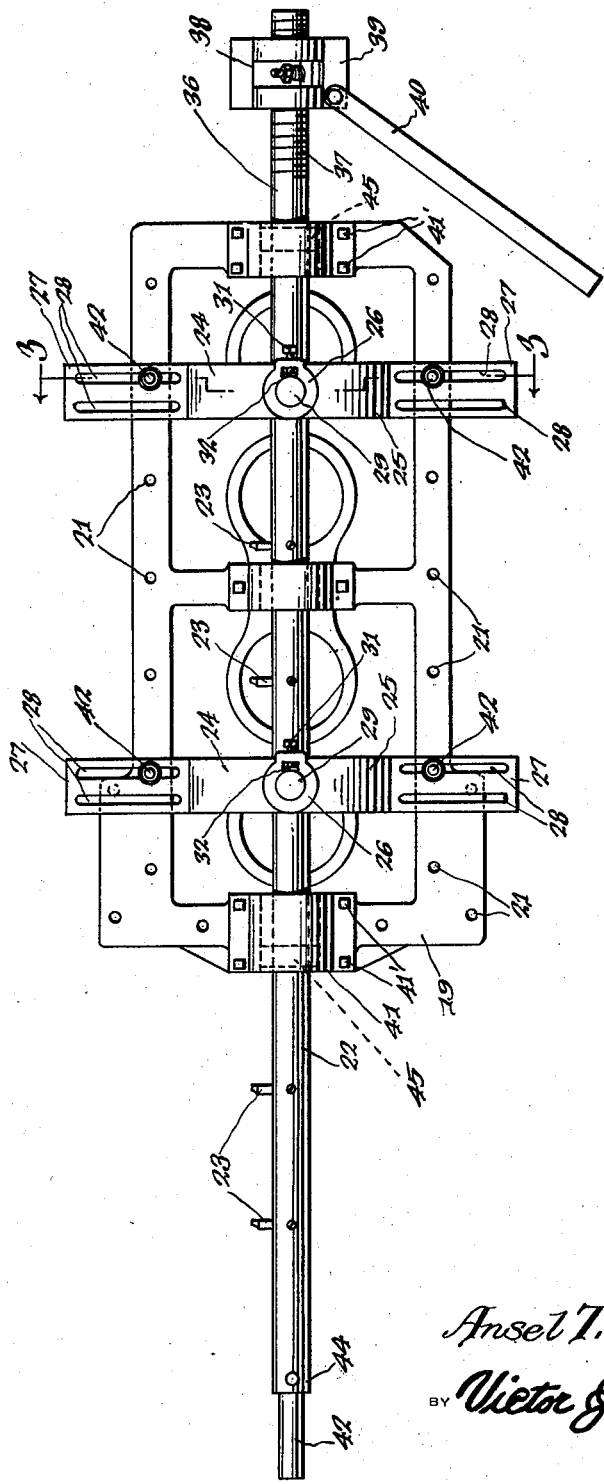
Fig. 1 is a plan view of the invention showing the same in operative position upon an engine block.
Figure 2:
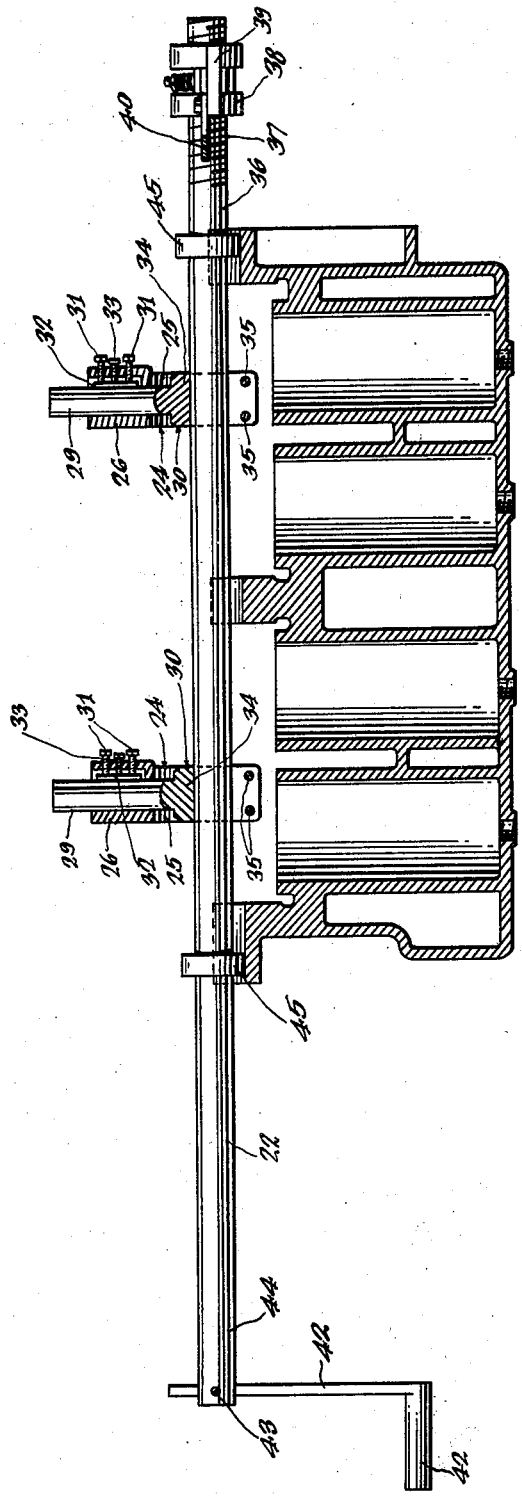
Fig. 2 is a central longitudinal vertical sectional detail view of the same.
Figure 3:
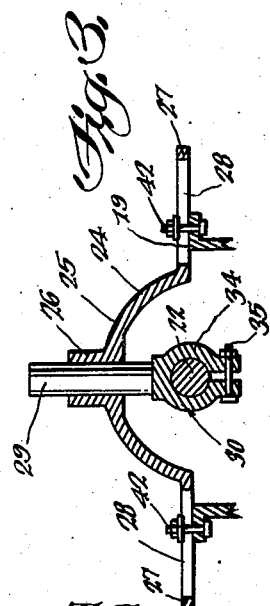
Fig. 3 is a sectional detail view taken substantially on line 3—3 of Fig. 1.

My improved reboring tool includes a boring bar 22 which adjustably carries the cutting tools set by a micrometer so that they will bore the bearings to precisely the size desired.

The means for attaching and supporting the boring bar 22 in proper aligned position includes carriage plates 24. These carriage plates 24 have their intermediate portions arched upwardly as at 25 and formed on these arched portions are bearing sleeves 26. The end portions 27 of the carriage plates each have formed therein spaced parallel extending slots 28 for reasons hereinafter set forth. Adjustably mounted in the bearing sleeves 26 of the carriage plates 24 are studs 29 of the boring bar supporting arms indicated generally at 30. These studs 29 are secured in proper adjusted position within the bearing sleeves 26 through the medium of cooperating set screws 31 which are threaded to bear against plates 32 mounted in the sleeves and swivelly supported by set screws 33. The studs 29 have lower end portions formed to provide bearings 34 which are adapted to receive the boring bar 22, said bearings being of the split type and adapted to adjust to the boring bar through the medium of nut receiving bolts 35.

The end portion 36 of the boring bar has threads 37 formed thereon and these threads 37 are adapted to engage the threads (not shown) of a feed nut 38 which may be of any approved construction. This feed nut 38 has attached to a flange 39 thereof a stop bar 40 which is adapted to engage any place on the crank case to hold the feed nut against rotation.

Movable longitudinally with respect to the boring bar are collars 45, said collars having central bores for close fit with respect to the said bar and cylindrical surfaces for close fit when seated in the bearing sections. These collars 45, as above indicated, are adapted to be seated in the integral bearing sections of the engine block for centering and aligning the boring bar with respect to the bearing sections.

In use the bearing caps 41 are removed and the boring bar mounted with the collars 45 shifted longitudinally with respect to the boring bar for seating in the bearing sections. The collars when seated in the bearing sections properly center and align the boring bar with respect to these bearing sections and after this has been accomplished the carriage plates flatly rest upon the rim 19 of the crank case to adjust the studs 29 in the bearing sleeves 26. The carriage plates are now secured to the rim 19 of the crank case through the medium of nut receiving bolts 42 which have their shank portions projecting through certain of the slots 28 and openings 21, the latter being formed in the rim 19. The set screws 31 and 33 are now adjusted to secure the studs 29 within the bearing sleeves 26. After this has been accomplished the collars 45 are removed from seated position in the bearing sections and the bearing caps remounted in position and secured to the engine block through the medium of the bolts 41 of the usual construction. The boring bar 22 is now rotated through the medium of the handle 42 secured as at 43 to its end portion 44.

From this it will be seen that I provide a simple and efficient means for boring the main bearings of an internal combustion engine block and for centering and aligning the boring bar with respect to the bearings and that the tool comprises few parts which may be assembled for boring operation by others than those skilled in the art and that the manner of adjusting the tool in position, by reason of the simplicity of the device, is practically self-explanatory to the mechanic.

As the boring bar 44 is rotated the cutting tools 23 will be brought into cutting position with respect to the babbitt of the bearings and longitudinal feeding of the boring bar is accomplished by the feed nut 28 which is held against rotation by the stop bar 40.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. In a device for boring the main bearings of an internal combustion engine block, a carriage member having elongated foot portions and an upwardly arched portion intermediate said foot portions, said foot portions having longitudinally extending slots therein, means extendable through said slots for connecting said foot portions to said block, a bearing structure at substantially the midpoint of said arched portion, and extended at rightangles to the extent of said arched bore, said bearing portion having a bore extending therethrough and a recess communicating with said bore at one side thereof for a portion of the extent thereof, a stud shaft extended through said bore, a plate disposed in said recess, means for forcing said plate into engagement with said shaft to hold said shaft against movement, a bearing structure at the lower end of said stud shaft, and a boring bar rotatably mounted in said last named bearing structure.

2. In a device for boring the main bearings of an internal combustion engine block, a carriage member having elongated foot portions and an upwardly arched portion intermediate said foot portions, said foot portions having longitudinally extending relatively elongated slots therein, means extendable through said slots for connecting said foot portions to said block, a bearing structure at substantially the midpoint in said arched portion having a bore therein extended substantially at rightangles to the extent of said arched portion, said bearing structure having a recess therein communicating with said bore for a portion of the extent thereof, a stud shaft disposed in said bore, a plate in said recess, screw members carried by said bearing structure and bearing against said plate to force said plate into engagement with said stud shaft to hold said shaft in predetermined positions, another bearing structure at the lower end of said stud shaft, a boring bar journaled in said last named bearing structure, means for imparting axial movement to said boring bar, and cutting tools on said boring bar adjacent the bearings of said block whereby said cutting tools may act on said bearings when said bar is rotated.

In testimony whereof I affix my signature.

ANSEL T. GREEN.